Feb. 17, 1931. J. J. COOK Re. 17,970

PULL CHAIN TERMINAL

Original Filed June 3, 1927

Inventor
John J. Cook
by J. Daniel Stuwe
Attorney.

Reissued Feb. 17, 1931

Re. 17,970

UNITED STATES PATENT OFFICE

JOHN J. COOK, OF CHICAGO, ILLINOIS

PULL-CHAIN TERMINAL

Original No. 1,672,929, dated June 12, 1928, Serial No. 196,357, filed June 3, 1927. Application for reissue filed November 29, 1929. Serial No. 410,617.

My invention relates to improvements in pull chain terminals; and more particularly such as are adapted to be used on electric lights.

An object of my invention is to provide a pull chain terminal which may be made at a minimum cost, of light material, such as thin sheet brass; but which is so made that it is strong enough to resist a compression strain or a tension strain.

A further object is to provide a terminal which necessitates the use of relatively little material, thereby further decreasing the cost of manufacture.

A still further object is to provide a terminal having a slot for admitting the central wire portion of a pull chain, the terminal being so constructed that when it is attached to the chain the slot will be substantially closed, thus obviating the necessity of soldering or further steps in the making of the terminal.

These objects, and other objects and advantages attained with my invention, will become apparent from the following description, taken in connection with the accompanying drawing, in which Fig. 1 is a side elevational view of the device, showing one embodiment of this invention, mounted on a pull chain.

Figure 1:
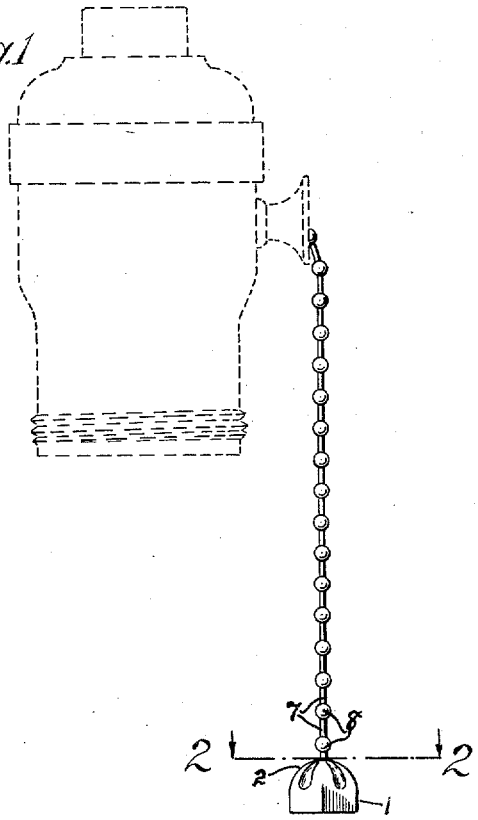
Figure 2:
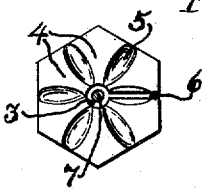
Fig. 2 is an enlarged plan view thereof, taken on line 2—2 of Fig. 1.

In carrying out my invention, I make use of a piece of thin metal, such as brass. This is stamped into the form illustrated in the drawing, wherein I have shown a hexagonal shape as being the preferred form, although other shapes might be used without departing from the invention.

It will be observed that this improved device has a body portion 1 which is curved at its top or upper end, as shown at 2, to form a small bell-shaped member, and is provided with a central upper opening 3 in said top. Said top is corrugated to provide ridges 4 alternating with grooves 5. A slot 6 extends from the central opening 3 to the lower edge of the terminal.

From the foregoing description of the device, the operation thereof may be readily understood.

The main feature of the invention, as stated before, is to provide a terminal which can be cheaply made, but which will have a pleasing appearance and which will not crush under the ordinary force used in manipulating the electric switch, although the device is made of sheet metal which is relatively thin.

Figure 3:
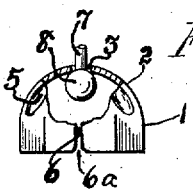
Fig. 3 is an enlarged side view thereof, a portion being broken away.
Figure 4:
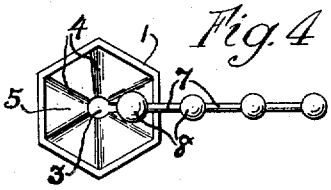
Fig. 4 is an enlarged inverted plan view thereof.

The terminal is attached to the chain by slipping the central wire portion 7 of the chain into the slot 6. In order to guide it into the slot, I preferably widen the latter slightly, as shown at 6*a* in Fig. 3. One of the balls 8 of the chain is slipped underneath the opening 3, where it is centered. Owing to the corrugations, the sides of the slot will spring together so that it will be virtually closed, as shown in Fig. 1, thereby obviating the necessity of any further steps in the manufacture.

I have found that where these corrugations are not present, as for instance where the terminal is made of a smooth, hemispherical shell, there will not be this spring action which tends to close the slot and that the slot will tend to remain open. The corrugating of the terminal, therefore, has a double function. It makes possible the use of a very thin piece of metal in the making of a terminal which would otherwise be crushed out of shape, and at the same time it provides a spring action, so that when the chain is in position in the terminal, the slot will be closed.

It is necessary that the axis of the corrugations be substantially transverse to the direction of the slot. If, for instance, the corrugations were concentric with the opening 3, then the slot from the central opening to the lower edge would not be closed, upon passing the central wire of the chain therethrough.

The corrugations also prevent any possibility of the chain pulling out from the central opening, by the springing apart of the metal.

This improved terminal is designed and provided to take the place of the customary ball terminals, which are difficult to make because they require a number of operations in the manufacture thereof, thereby considerably increasing their cost; whereas with this invention I have provided a terminal which can be made with one stamping operation, and of very thin metal, thereby greatly reducing its cost; and this terminal can then be readily mounted on the pull chain by merely moving the central wire portion of the latter through the slot into the central opening.

Figure 5:
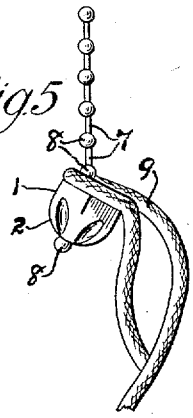
Fig. 5 is a view showing an extension cord being applied to the terminal and pull chain.
Figure 6:
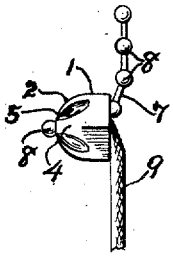
Fig. 6 shows the position of the members when the cord and the terminal have been applied to the pull chain.

Another useful feature connected with my improved terminal is that it may be used in connection with an extension cord by merely looping the cord over the pull chain above the terminal. In Fig. 5 I have thus illustrated the terminal as being reversed from the position shown in Fig. 1; and thereby the bottom ball or end ball of the ball chain is positioned outside instead of inside of the terminal. It is only necessary to loop the cord 9 over the chain at the open end or mouth of the terminal, and then pull it down so that the chain and terminal and cord will assume substantially the position shown in Fig. 6; and said terminal will function in securely holding said cord in position on said chain during use; while, ordinarily, with the terminals of the other types, the extension cords have to be tied upon the chains to prevent disengagement of the cords during use.

What I claim as my invention and desire to secure by Letters Patent is:

1. A pull chain terminal, comprising a single piece of relatively thin metal stamped into bell shape and having radially extending ridges and grooves on its closed end, said closed end having a central opening, and a slot from said central opening to the edge of the terminal.

2. A pull chain terminal, comprising a single piece of metal stamped into bell shape and having corrugations extending from a point near the center of the closed end toward the edge of the bell shaped piece, said closed end having a central opening, and a slot extending from said central opening to the edge of the terminal, the longitudinal axis of the slot being at right angles to the axis of the adjacent corrugations.

3. A pull chain terminal, comprising a single piece of relatively thin metal stamped into bell shape and having radially extending ridges and grooves on its closed end, said terminal being adapted to be reversed upon the pull chain, said closed end having a central opening and a slot from said central opening to the edge of the terminal.

4. A pull chain terminal comprising a piece of relatively thin metal stamped into a bell-shaped member having a central opening at the closed upper end and a slot extending therefrom to the lower edge, to receive the central wire portion of a pull chain passed through said slot, said terminal having its thin metal curved to provide reinforcement and resiliency to urge the metal at the sides of said slot together and to normally hold the slot closed for positively retaining said central wire in said opening.

5. A pull chain terminal consisting of a single bell-shaped member having a central opening at the closed upper end and a normally closed slot extending from said opening to the lower end for receiving the central wire portion of a pull chain passed through said slot, the metal of said terminal being arranged to provide reinforcement for the thin metal and resiliency to retain the slot closed and retain said wire in said opening, and said terminal being mountable in reversed position upon said chain for holding an extension cord thereon within said terminal.

6. A pull chain terminal consisting of a single piece of relatively thin metal stamped into a substantially dome-shaped member, the closed rounded upper end having a round central opening therein, and a slit extended from said central opening to the lower edge of said terminal, said terminal having means thereon extending downwardly from the top to the lower edge for reinforcing said thin metal of the terminal and for providing inherent resiliency to normally close said slit and securely retain the wire portion of the pull chain in said central opening after being passed through said slit.

In testimony whereof I have signed my name to this specification.

JOHN J. COOK.